US010027710B2

(12) United States Patent
Stojanovski et al.

(10) Patent No.: US 10,027,710 B2
(45) Date of Patent: Jul. 17, 2018

(54) NAT TRAVERSAL FOR LOCAL IP ACCESS

(71) Applicant: LG ELECTRONICS INC., Seoul (KR)

(72) Inventors: Saso Stojanovski, Paris (FR); Arnaud Vedrine, Paris (FR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/219,039

(22) Filed: Jul. 25, 2016

(65) Prior Publication Data

US 2017/0026412 A1   Jan. 26, 2017

Related U.S. Application Data

(63) Continuation of application No. 13/496,462, filed as application No. PCT/KR2010/007519 on Oct. 29, 2010, now Pat. No. 9,420,000.
(Continued)

(51) Int. Cl.
*H04L 29/06* (2006.01)
*H04W 12/02* (2009.01)
*H04L 12/46* (2006.01)
(Continued)

(52) U.S. Cl.
CPC ........ *H04L 63/164* (2013.01); *H04L 12/4633* (2013.01); *H04L 63/029* (2013.01);
(Continued)

(58) Field of Classification Search
CPC ... H04L 69/22; H04L 12/4633; H04L 63/164; H04L 63/00; H04L 63/16; H04L 63/029;
(Continued)

(56) References Cited

U.S. PATENT DOCUMENTS 7,706,371 B1 * 4/2010 Wing ............... H04L 12/56
370/392
2009/0016282 A1   1/2009 Gasparroni et al.
(Continued)

OTHER PUBLICATIONS

TR 23.829 (technical report 3GPP TR 23.829 V0.2.1, Sep. 2009, 19 pages).*

*Primary Examiner* — Thai Vu
(74) *Attorney, Agent, or Firm* — Birch, Stewart, Kolasch & Birch, LLP

(57) ABSTRACT

A node is provided that includes a home base station collocated with a local gateway (L-GW) providing access to a local Internet Protocol (IP) network. The node performs an establishment procedure with a security gateway (SeGW), and discriminates a packet. The node uses a first interface configured at the L-GW and a second interface which is configured between the home base station and a gateway for the home base station. The first and second interfaces are tunneled through a same IP security (IPsec) tunnel opened between the home base station and the SeGW. The home base station for the first interface uses a first IP address that is either same as or different from a second IP address used by the home base station for the second interface. The node uses either distinct ranges of Tunnel Endpoint Identifiers (TEIDs) or the first and second IP addresses to discriminate the packet.

10 Claims, 14 Drawing Sheets

Related U.S. Application Data

(60) Provisional application No. 61/375,016, filed on Aug. 18, 2010, provisional application No. 61/257,434, filed on Nov. 2, 2009.

(51) Int. Cl.
  *H04W 76/12* (2018.01)
  *H04W 8/08* (2009.01)
  *H04W 84/04* (2009.01)
  *H04W 80/04* (2009.01)

(52) U.S. Cl.
  CPC .......... *H04W 12/02* (2013.01); *H04W 76/12* (2018.02); *H04W 8/082* (2013.01); *H04W 80/04* (2013.01); *H04W 84/045* (2013.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/146* (2018.01); *Y02D 70/23* (2018.01)

(58) Field of Classification Search
  CPC ... H04W 80/04; H04W 84/045; H04W 12/02; H04W 8/26; H04W 8/082; H04W 76/022; H04W 76/12; Y02B 60/50; Y02D 70/1222; Y02D 70/1224; Y02D 70/1242; Y02D 70/1262; Y02D 70/142; Y02D 70/146; Y02D 70/23
  USPC .... 455/435.1, 560, 561, 444, 410, 411, 445, 455/428
  See application file for complete search history.

(56) References Cited

U.S. PATENT DOCUMENTS

| | | |
|---|---|---|
| 2009/0059848 A1 | 3/2009 | Khetawat et al. |
| 2009/0156213 A1 | 6/2009 | Spinelli et al. |
| 2009/0232019 A1 | 9/2009 | Gupta et al. |
| 2009/0268668 A1 | 10/2009 | Tinnakornsrisuphap et al. |
| 2011/0032871 A1 | 2/2011 | Xu et al. |
| 2011/0038318 A1* | 2/2011 | Parsons ................. H04W 80/04 370/328 |
| 2012/0178416 A1* | 7/2012 | Miklos .............. H04L 29/12066 455/410 |

* cited by examiner

[Fig. 5]
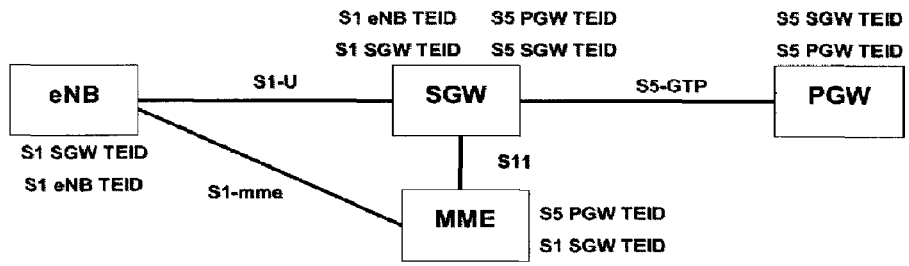
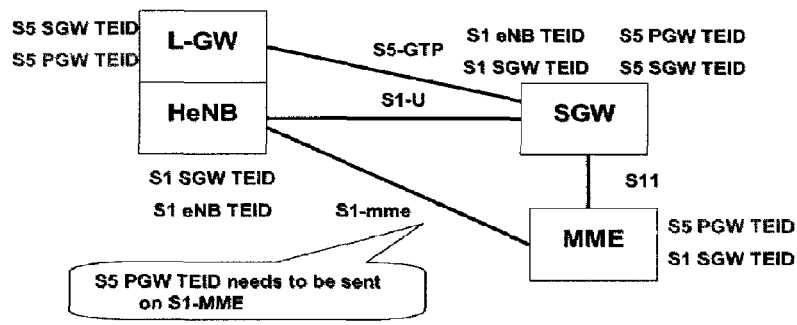
[Fig. 6]
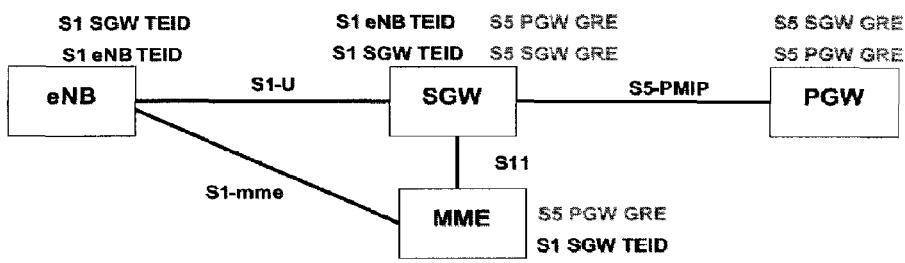
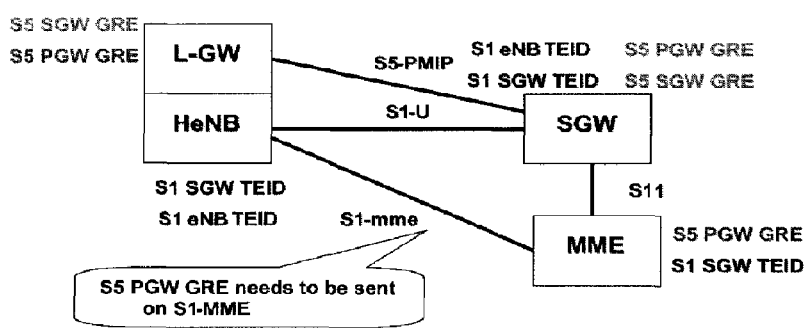

[Fig. 7]
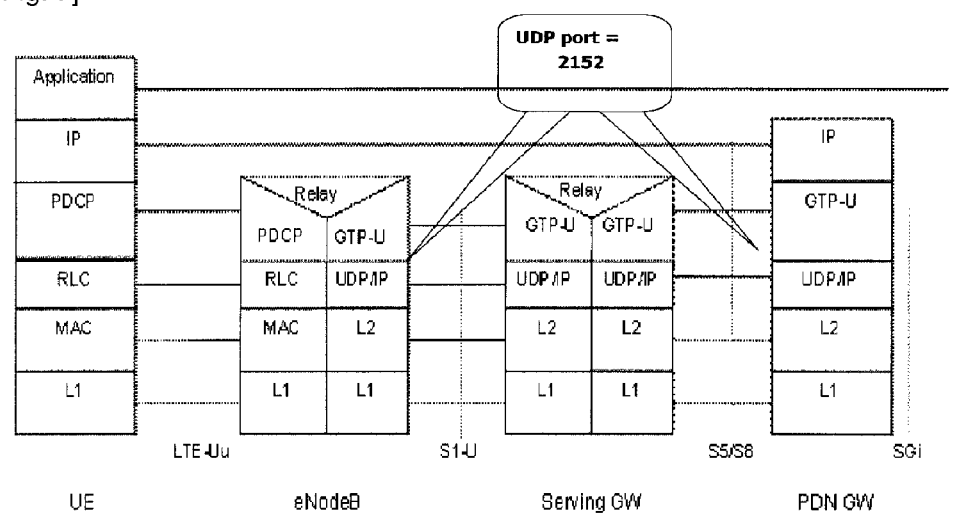

[Fig. 8]
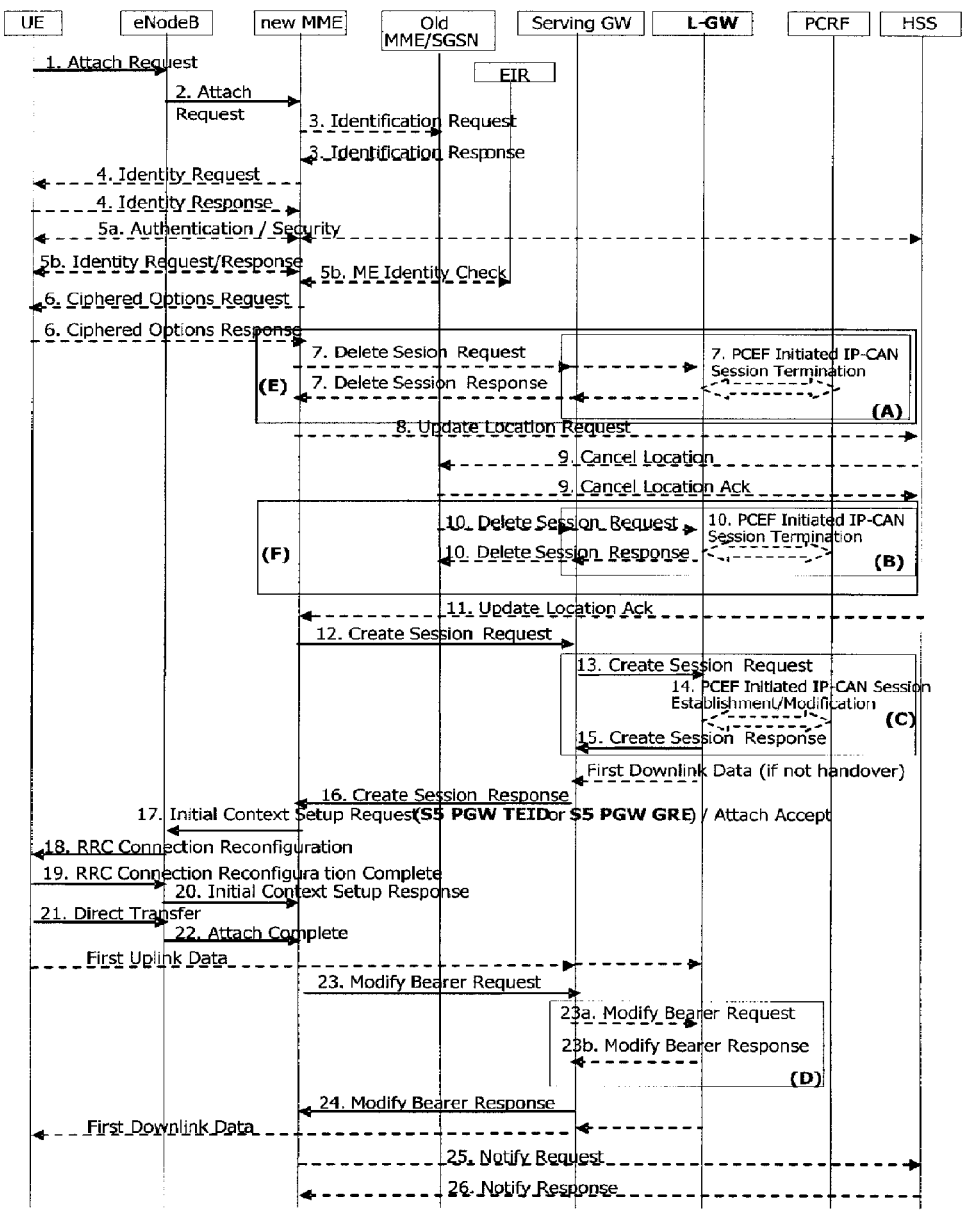

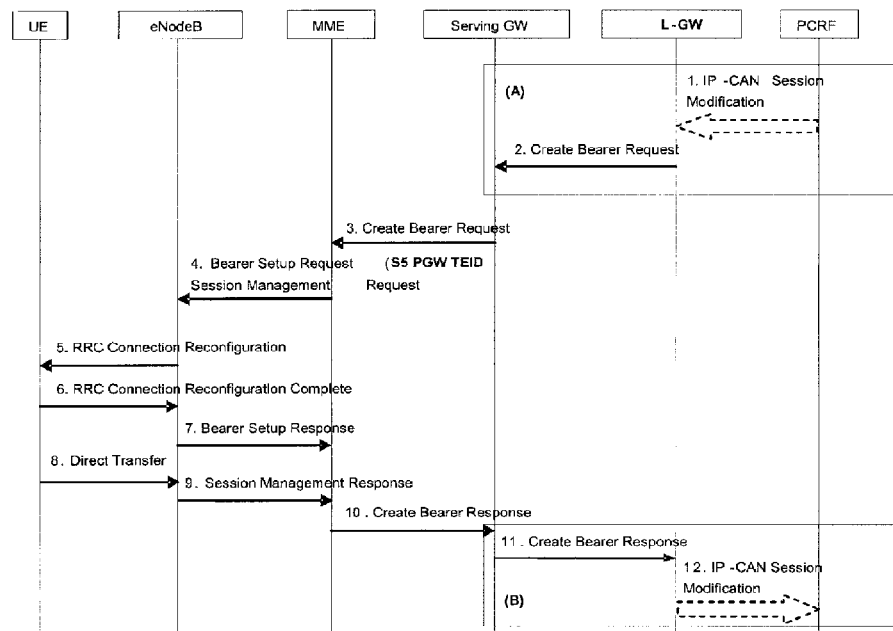

[Fig. 10]
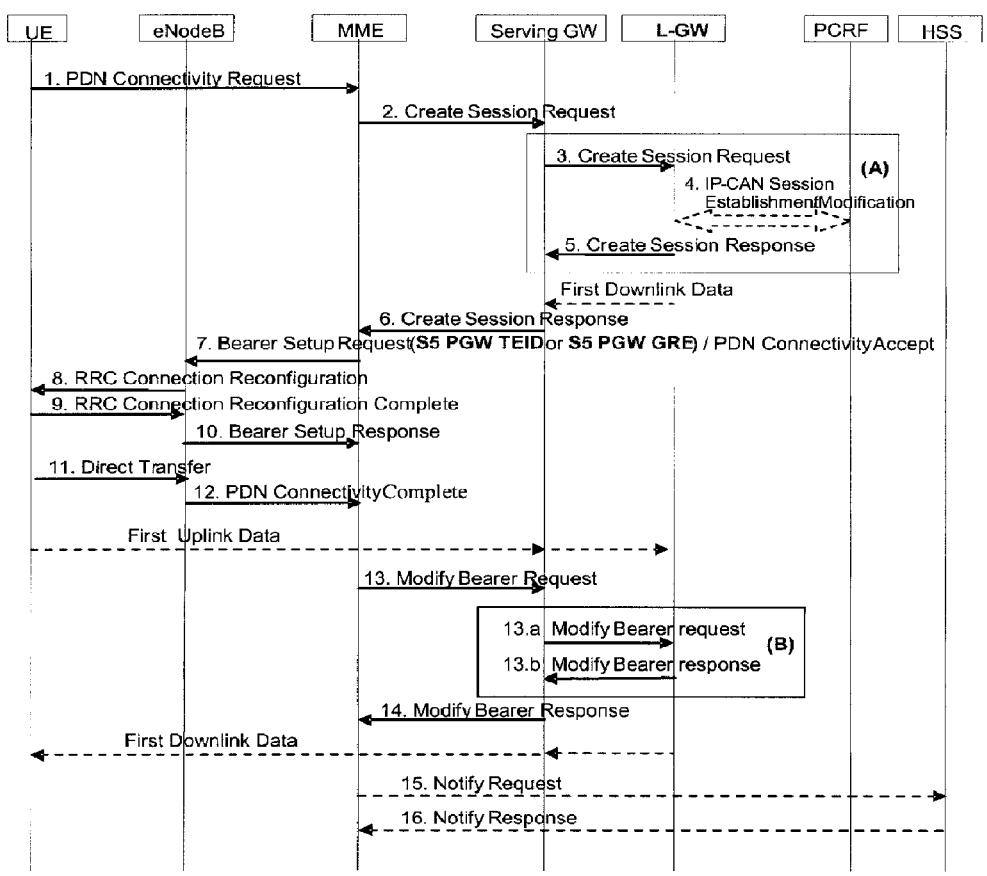

[Fig. 11]
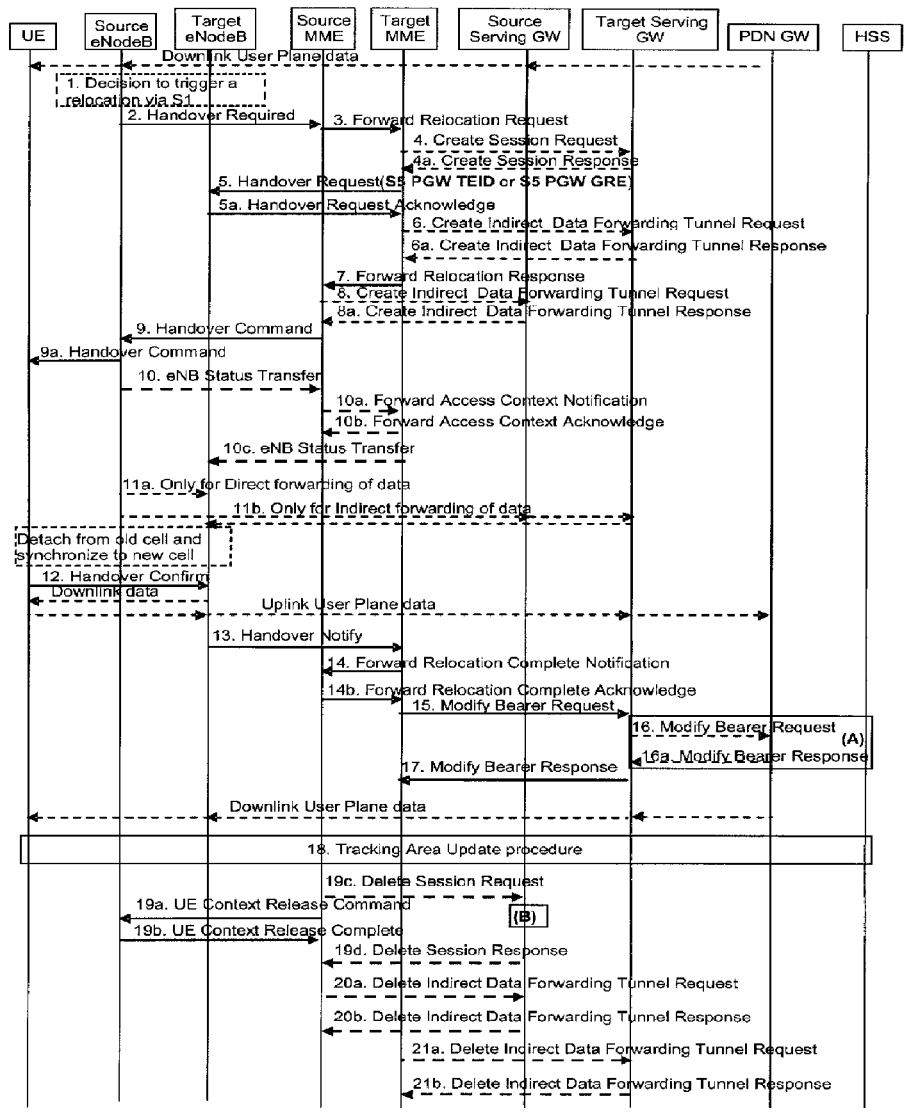

[Fig. 12]
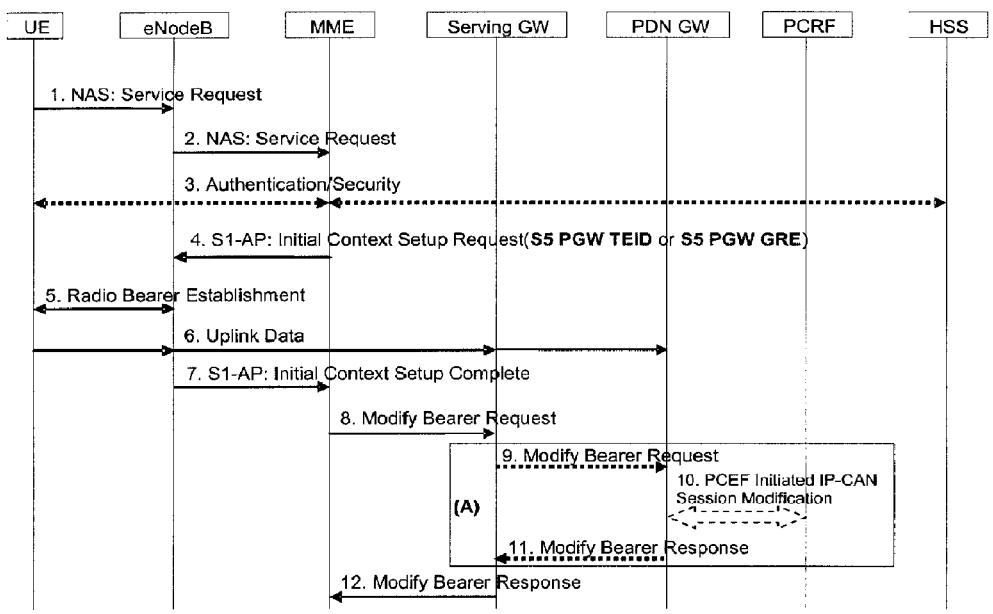
[Fig. 13]
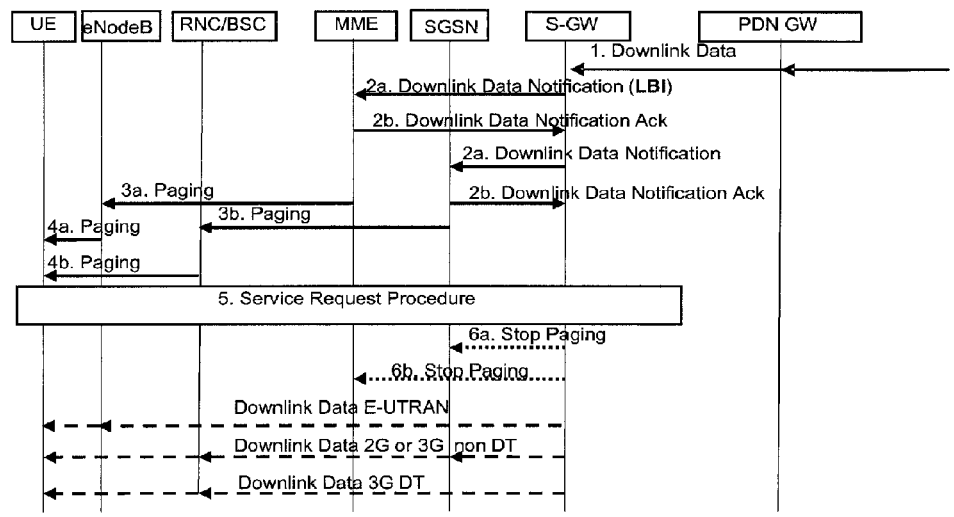

NAT TRAVERSAL FOR LOCAL IP ACCESS

CROSS REFERENCE TO THE RELATED APPLICATIONS

This Application is a Continuation of co-pending U.S. patent application Ser. No. 13/496,462 filed on Apr. 9, 2012, which is the National Phase of PCT/KR2010/007519 filed on Oct. 29, 2010, which claims the benefit under 35 U.S.C. § 119(e) to U.S. Provisional Application Nos. 61/375,016 filed on Aug. 18, 2010 and 61/257,434 filed on Nov. 2, 2009, all of which are hereby expressly incorporated by reference into the present application.

BACKGROUND OF THE INVENTION

Field of the Invention

The invention relates to local IP access, also known as LIPA. LIPA is a feature of mobile communication networks, which was introduced in Release-10 of 3GPP (see in particular section 5.7.1 of 3GPP TS 22.220 V10.0.0, 2009-09).

Discussion of the Related Art

With the progressive convergence of the Internet world and of the telecommunications world, most services that are offered on the Internet become available on mobile phones, and conversely voice services become available through the Internet (Voice over IP). In addition, fixed-mobile convergence aims at proposing single communication devices able to connect both to a cellular network (e.g. when travelling) and to a local network (such as a home network, when at home, or a corporate network, or a hotspot). While fixed-mobile convergence is not yet a widespread reality, many communication devices already have both a radio interface to connect to cellular networks, and another radio interface to connect to a local network. Most often the two radio interfaces are used independently though (i.e. the user selects manually, either explicitly or implicitly, which radio technology he wants to use). Having two radio interfaces forces the communication device to embed two different radio technologies (e.g. WLAN interface and cellular radio interface), which is more expensive, takes more space (while size and weight are important characteristics), and consumes a lot of energy since two radio interfaces need to be powered, which reduces the autonomy of the communication device (and also reduces battery life).

Cellular networks are very convenient because they offer an extremely broad coverage (for example a GSM user can typically make phone calls from almost anywhere in the world). However, their bandwidth is typically rather low compared to the bandwidth offered to users of local networks (which are typically connected to the Internet through rather high speed connections such as fiber, DSL or cable, for home networks). In addition, they are in general more expensive to use. Despite their extensive coverage, cellular networks are not always available, for example they are not available in certain remote locations (such as certain rural areas, or certain very small villages), or indoor locations not reachable by the cellular network's signals (basements, rooms surrounded by several layers of walls, etc.).

Small cellular base stations called femtocells can be used to mitigate the unavailability of cellular networks, as long as an alternate network access (typically a wired network) is available. Femtocells can typically be simple devices installed by end users themselves. Femtocells behave like a cellular network with respect to communication devices (which can use their regular cellular network radio interface to communicate with them), and connect to a cellular network operator's core network through the alternate network access (such as Internet access via fiber, DSL or cable subscriptions). Femtocells can be developed for any types of cellular networks technologies, for example WCDMA, GSM, CDMA2000, TD-SCDMA, WiMAX or LTE technologies. The 3GPP refers to 3G femtocells as Home Node Bs (HNBs), and in LTE the proper terminology for a femtocell is Home eNode B (HeNB). Femtocells are in fact "home" cellular base stations.

In the context of fixed-mobile convergence of voice services, the use of femtocells is an advantageous alternative to the embedding of two different radio technologies in a communication device, since the communication device becomes simpler to implement, can be smaller, lighter, cheaper, and have a better battery autonomy.

LIPA goes one step further and aims at providing access from a communication device to a home-based network (for any kind of IP based services, not only for voice) through a femtocell. A home-based network is in fact any kind of local network (e.g. it can be in a residential or corporate environment, or a public hotspot), i.e. it is not necessarily a network in the home of an individual (the term "home" has to be understood in a broad sense, the same applies to other expressions such as "home" cellular base station).

Although an initial specification of LIPA is already available, LIPA is still being specified as not all issues have been addressed. LIPA is therefore the subject of standardization efforts at 3GPP. Many aspects of LIPA are still expressed as goals to be achieved, without indications on how to achieve these goals.

One class of LIPA solutions that are currently under study in 3GPP is referred to as the "solutions relying on Local Packet Data Network (PDN) connection". With this type of solutions there are several open issues.

The technical report 3GPP°TR°23.8xy v0.2.0 ("Local IP Access and Selected IP Traffic Offload") is a study of architectural solutions for LIPA to the home-based network from a femtocell (Home NodeB or Home eNodeB), as well as a study of architectural solutions for Selected IP Traffic Offload (SIPTO) for both femtocells and macrocells. The number 23.8xy was a temporary name for the technical report on LIPA when the first patent application (U.S. 61/375,016) which priority is claimed in the present patent application was filed (Nov. 2, 2009). It was later assigned a permanent TR number by the 3GPP administration (TR 23.829). All versions of this document are stored under the permanent name on the 3GPP web site. TR°23.829 v0.2.0 was updated by technical contributions submitted to 3GPP by the inventors of the present invention, after the priority date of the present application. The LIPA solutions under study in this technical report when the first priority application was filed can be broadly summarized in two categories. The first one relates to solutions based on traffic breakout performed within H(e)NB using a local PDN connection, and the second one relates to solutions relying on a NAT (Network Address Translation) device. The first category is of particular interest in the context of the invention. The technical report was still in study phase and did not contain any full-blown architecture figure agreed in the standard at the priority date of the present application. Instead it contained a list of architectural requirements, architectural principles and a list of open issues and proposed solutions to such issues. FIG.°1 highlights some of the possible architecture requirements for a LIPA solution for HeNB using a local PDN connection according to the technical report.

The following are possible LIPA requirements according to FIG.°1. A Local PDN Gateway (L-GW) function is collocated with the HeNB (for example it can be embedded in the HeNB, or each function can be embedded in a corresponding device, both devices being in the same geographical location). The local PDN Gateway provides direct IP access to the home-based IP network. The Mobility Management Entity (MME) and Serving GateWay (SGW) nodes are located in the operator's Evolved Packet Core (EPC). A Security Gateway (SeGW) node is located at the edge of the operator's core network; its role is to maintain a secure association with the HeNB across the IP backhaul network that is typically owned by a different provider and is therefore considered insecure. A Home router (which typically behaves as a NAT device) is located at the boundary of the home-based IP network and the IP backhaul network, as typically found in DSL or cable access deployments today. It is also possible to have an element (optional), depicted in FIG.°1 consisting of an external PDN Gateway (PGW) located in the operator's core network. This element may be used when the user needs to access services provided by the operator, in parallel to accessing the home-based network.

3GPP TR 23.8xy v0.2.0 identifies the following open issues with the type of architectures described above.

One issue that needed to be solved in this context included the definition of signaling information needed for establishment of optimal data path (this is referred to as "optimal routing" or "optimized routing information issue"). More particularly, for active UEs, there was a need to find mechanisms to optimize the routing of the EPS/UMTS bearers used for LIPA traffic, allowing the user plane to bypass the Core SGW and SGSN. What was still unanswered was in particular the type of information that can be used by the HeNB and the L-GW in order to establish the direct path ("optimized routing information issue"). Specifically, for a specific UE, the kind of information that could be used by the HeNB to discriminate between uplink packets destined to the home-based network (i.e. the L-GW) and uplink packets destined to the external PGW was unknown. For a specific UE, the kind of information to be used by the HeNB to map the downlink packets received from the L-GW on the appropriate Radio Bearers was also unknown.

Another issue lies in the fact that the proposed solution is expected to work when the local breakout point (L-GW) is located in a private address domain, e.g. behind a NAT gateway (this is referred to as the "NAT issue", or "operation behind a NAT device").

How to assist the backhaul operator to perform legal intercept is another issue (referred to as the "Lawful Intercept issue").

How paging works in this architecture was still an open issue, as per the following excerpt from TR°23.8xy: "it is FFS whether IDLE mode downlink packet buffering and initiation of network triggered service request procedure should be local to the H(e)NB, leading to two SGWs per UE (one in Core Network and one in H(e)NB subsystem or transport backhaul network), which is not in line with current TS 23.401 architecture principles, or whether this function should be in the Core Network".

Starting from Release 99, the 3GPP specifications make provisions for access to a private enterprise network (intranet) from any macro cell. This is often referred to as network-based VPN access.

With LIPA it becomes possible to access the enterprise network from a femtocell, in a way that all traffic bound to/from the enterprise network is routed locally, without leaving the enterprise.

A major difference between the macro versus femto scenarios resides in the Gateway that represents the ingress point to the intranet. In the macro scenario the terminal establishes a Packet Data Network (PDN) connection to a PDN Gateway (PGW) that is part of the operator's Evolved Packet Core (EPC) and has pre-established a layer 2 tunnel to an ingress point in the intranet. In contrast, in the femtocell scenario the terminal establishes a connection to a Local Gateway (L-GW) residing inside the enterprise network.

Assuming that the same Access Point Name (APN) is used to access the enterprise network in both cases, some additional information is required in order to assist the EPC in selecting the right gateway, depending on whether the terminal is establishing the connection from the enterprise's femtocell or from somewhere else.

FIG. 2 depicts a scenario where the UE can access the Enterprise network via either a macro cell (eNodeB—eNB) or a femto cell (Home eNodeB ? HeNB).

For VPN access via a macro cell the signaling path for PDN connection establishment is illustrated with an arrow going from the UE to the PGW (with two solid lines). Based on the PDN connection request received from UE, the Mobility Management Entity (MME) checks the APN requested by UE against its subscription record in the HSS, as described in 3GPP TS 23.401 ("Evolved Packet Core for 3GPP access"). If the UE is authorized to access the requested APN, the MME performs PGW selection relying on DNS resolution of the APN-FQDN i.e. a Fully Qualified Domain Name that is constructed with the APN substring, as specified in 3GPP TS 23.003 ("Numbering, Addressing and Identification") and 3GPP TS 29.303 ("Domain Name System Procedures; Stage 3").

For instance, if the APN for VPN access is "companyAB-Cvpn", the corresponding APN-FQDN, used for DNS resolution, will typically be constructed as: "companyABCvpn.epc.mnc015.mcc234.3gppnetwork.org".

In contrast, for enterprise access via LIPA, the signaling path for PDN connection establishment is depicted with an arrow going from the UE to the L-GW (with two dotted lines). In this case the MME would need to override the usual DNS resolution based on APN-FQDN and perform L-GW selection based on information other than, or in addition to, the APN.

At the time the first priority application was filed, there were two alternatives for L-GW selection described in 3GPP TR 23.829 v1.1.0 ("LIPA and SIPTO"), but there was no agreement yet which one should be standardized. The first proposal is to have the L-GW address signaled from the RAN (Radio Access Network, i.e. from the HeNB). The other proposal is to use DNS based resolution with an FQDN that contains the CSG identifier of the femtocell.

For sake of simplification, FIG. 2 makes the assumption that the Serving Gateway (SGW) is located outside of the Enterprise network, even for LIPA access. While this is a possibility, it is more likely that for LIPA access the system would select a SGW that resides inside the Enterprise network (L-SGW in FIG. 3) and is collocated with the L-GW, as depicted in FIG. 3.

The current solution is problematic when the same APN may be used to access the Enterprise network via both a macrocell and a femtocell. Indeed, the Mobility Management Entity (MME), which performs the PGW/LGW selection, does not know which gateway to select since it depends on whether the terminal is requesting PDN connection establishment from the Enterprise femtocell or from somewhere else. The APN may be identified as being "LIPA only", "LIPA prohibited", or "LIPA conditional", but without regard to the CSG from which the PDN connection request originates.

The MME is aware whether the terminal is inside a femtocell, thanks to the CSG ID that is provided by the RAN in all UE-associated signaling messages. However, the user's subscription record in the HSS (at the time the first priority application was filed)provides no information about possible linkage between the requested APN and the CSG ID of the femtocell where the UE is currently residing.

If the MME selected the Enterprise L-GW whenever the UE requests the Enterprise APN from a femtocell, this would lead to the error case depicted in FIG. 4. Namely, consider the scenario where the user requests a PDN connection to the Enterprise APN via its home (residential) femtocell. In this case the MME must not select the L-GW residing in the Enterprise network (arrow going from the UE to the L-GW, with two dotted lines), instead it must select the PGW (arrow going from the UE to the PGW, with two solid lines), in the same manner as if the UE were in a macrocell.

Table 5.7.1-1 of 3GPP TS 23.401, which describes certain HSS data, is also useful for the understanding of the invention, and is reproduced below:

| Field | Description |
| --- | --- |
| IMSI | IMSI is the main reference key. |
| MSISDN | The basic MSISDN of the UE (Presence of MSISDN is optional). |
| IMEI/IMEISV | International Mobile Equipment Identity - Software Version Number |
| MME Identity | The Identity of the MME currently serving this MS. |
| MME Capabilities | Indicates the capabilities of the MME with respect to core functionality e.g. regional access restrictions. |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. |
| EPS Subscribed Charging Characteristics | The charging characteristics for the MS, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/Serving GW/PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform DNS queries. This replacement applies for all the APNs in the subscriber's profile. |
| RFSP Index | An index to specific RRM configuration in the E-UTRAN |
| URRP-MME | UE Reachability Request Parameter indicating that UE activity notification from MME has been requested by the HSS. |
| CSG Subscription Data | The CSG Subscription Data is a list of CSG IDs per PLMN and for each CSG ID optionally an associated expiration date which indicates the point in time when the subscription to the CSG ID expires; an absent expiration date indicates unlimited subscription. |
| Each subscription profile contains one or more PDN subscription contexts: | |
| Context Identifier | Index of the PDN subscription context. |
| PDN Address | Indicates subscribed IP address(es). |
| PDN Type | Indicates the subscribed PDN Type (IPv4, IPv6, IPv4v6) |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| Access Point Name (APN) | A label according to DNS naming conventions describing the access point to the packet data network (or a wildcard) (NOTE 6). |
| EPS subscribed QoS profile | The bearer level QoS parameter values for that APN's default bearer (QCI and ARP) (see clause 4.7.3). |
| Subscribed-APN-AMBR | The maximum aggregated uplink and downlink MBRs to be shared across all Non-GBR bearers, which are established for this APN. |
| EPS PDN Subscribed Charging Characteristics | The charging characteristics of this PDN Subscribed context for the MS, e.g. normal, prepaid, flat-rate, and/or hot billing subscription. The charging characteristics is associated with this APN. |
| VPLMN Address Allowed | Specifies whether for this APN the UE is allowed to use the PDN GW in the domain of the HPLMN only, or additionally the PDN GW in the domain of the VPLMN. |

-continued

| Field | Description |
| --- | --- |
| PDN GW identity | The identity of the PDN GW used for this APN. The PDN GW identity may be either an FQDN or an IP address. The PDN GW identity refers to a specific PDN GW. |
| PDN GW Allocation Type | Indicates whether the PDN GW is statically allocated or dynamically selected by other nodes. A statically allocated PDN GW is not changed during PDN GW selection. |
| PLMN of PDN GW | Identifies the PLMN in which the dynamically selected PDN GW is located. |
| Homogenous Support of IMS Over PS Sessions for MME | Indicates whether or not "IMS Voice over PS Sessions" is supported homogeneously in all TAs in the serving MME. |
| List of APN - PDN GW ID relations (for PDN subscription context with wildcard APN): | |
| APN - P-GW relation #n | The APN and the identity of the dynamically allocated PDN GW of a PDN connection that is authorised by the PDN subscription context with the wildcard APN. The PDN GW identity may be either an FQDN or an IP address. The PDN GW identity refers to a specific PDN GW. |

SUMMARY OF THE INVENTION

The invention seeks to improve the situation.

The invention relates in particular to a method for traversing a NAT device residing in a backhaul IP network. A home cellular base station (for example an HeNB in the LTE context) and a collocated local gateway L-GW providing access to a local IP network are connected to a mobile operator's packet core network through the NAT device. The method comprises the steps of opening an IPsec tunnel between the home cellular base station and a security gateway, and of tunneling at least two interfaces through the same IPsec tunnel. The IPsec tunnel is UDP-encapsulated for NAT traversal. The first interface is an interface whose local endpoint is the home cellular base station and whose remote endpoint is a node residing in the operator's packet core network. For example, if the first interface is an Iuh interface, the Iuh interface may be terminated on an HNB Gateway (i.e. the remote endpoint is the HNB GW), while if the first interface is an S1-U interface, the interface remote endpoint may be a serving gateway SGW. The second interface is an interface whose local endpoint is the local gateway and whose remote endpoint is a node residing in the operator's packet core network, such as a serving gateway SGW.

According to a possible embodiment, the first interface is an S1-U interface and the second interface is an S5 user plane interface.

Alternatively, the first interface may be an Iuh user plane interface while the second interface is an S5 user plane interface.

According to a possible embodiment, the local endpoint of each of the two interfaces is associated with a set of transport specific addresses. Each transport specific address of the set may, for example, be of the form {IP address, range of TEIDs}.

According to a possible embodiment, the local endpoint of each of the two interfaces has its own IP address, and the two IP addresses are obtained via the IKEv2 protocol.

Alternatively, the local endpoint of each of the two interfaces has the same IP address but a distinct range of TEIDs is assigned to each of the two local endpoints.

An embodiment of the invention also relates to a node comprising a home cellular base station and a collocated local gateway providing access to a local IP network. The node is connected to a mobile operator's packet core network through a NAT device residing in a backhaul IP network. The home cellular base station is set to establish an IPsec tunnel with a security gateway in order to traverse the NAT device. The node is set to tunnel at least two interfaces through the same IPsec tunnel. The first interface is an interface whose local endpoint is the home cellular base station and whose remote endpoint is a node residing in the operator's packet core network. As in the above method, in the Iuh case, the remote endpoint of the Iuh interface may be the HNB GW, while in the S1-U case, the interface remote endpoint may be the serving gateway SGW. The second interface is an interface whose local endpoint is the local gateway and whose remote endpoint is a node residing in the operator's packet core network, for example the serving gateway SGW.

According to a possible embodiment, the first interface is an S1-U interface and the second interface is an S5 user plane interface.

Alternatively, the first interface is an Iuh user plane interface and the second interface is an S5 user plane interface.

According to a possible embodiment, the node is set to associate the local endpoint of each of the two interfaces with a set of transport specific addresses.

According to a possible embodiment, the node is set to provide the local endpoint of each of the two interfaces with its own IP address, wherein the two IP addresses are obtained via the IKEv2 protocol.

Alternatively, the node is set to provide the local endpoint of each of the two interfaces with the same IP address and to assign a distinct range of TEIDs to each of the two endpoints.

BRIEF DESCRIPTION OF DRAWINGS

Other aspects and advantages of the invention will become apparent from the following detailed description of specific embodiments of the invention, and the accompanying drawings, in which:

FIG. 5 represents an optimized routing information with S5-GTP;

FIG. 6 represents an optimized routing information with S5-PMIP;

FIG. 7 represents a User plane protocol stacks with GTP-based S5;

FIG. 8 represents an attach procedure (from 3GPP TS 23.401 "Evolved Packet Core architecture for 3GPP accesses; Stage 2") with additional parameters in step°17;

FIG. 9 represents a Dedicated Bearer Activation Procedure (from 3GPP TS 23.401 "Evolved Packet Core architecture for 3GPP accesses; Stage 2") with additional parameters in step°4;

FIG. 10 represents a UE requested PDN connectivity (from 3GPP TS 23.401 "Evolved Packet Core architecture for 3GPP accesses; Stage 2") with additional parameters in step°7;

FIG. 11 represents an S1-based handover (from 3GPP TS 23.401 "Evolved Packet Core architecture for 3GPP accesses; Stage 2") with additional parameters in step°5;

FIG. 12 represents a UE triggered Service Request procedure (from 3GPP TS 23.401 "Evolved Packet Core architecture for 3GPP accesses; Stage 2") with additional parameters in step°4;

FIG. 13 represents a Network triggered Service Request procedure (from 3GPP TS 23.401 "Evolved Packet Core architecture for 3GPP accesses; Stage 2") with additional parameters in step°2a;

DETAILED DESCRIPTION OF THE INVENTION

Figure 1:
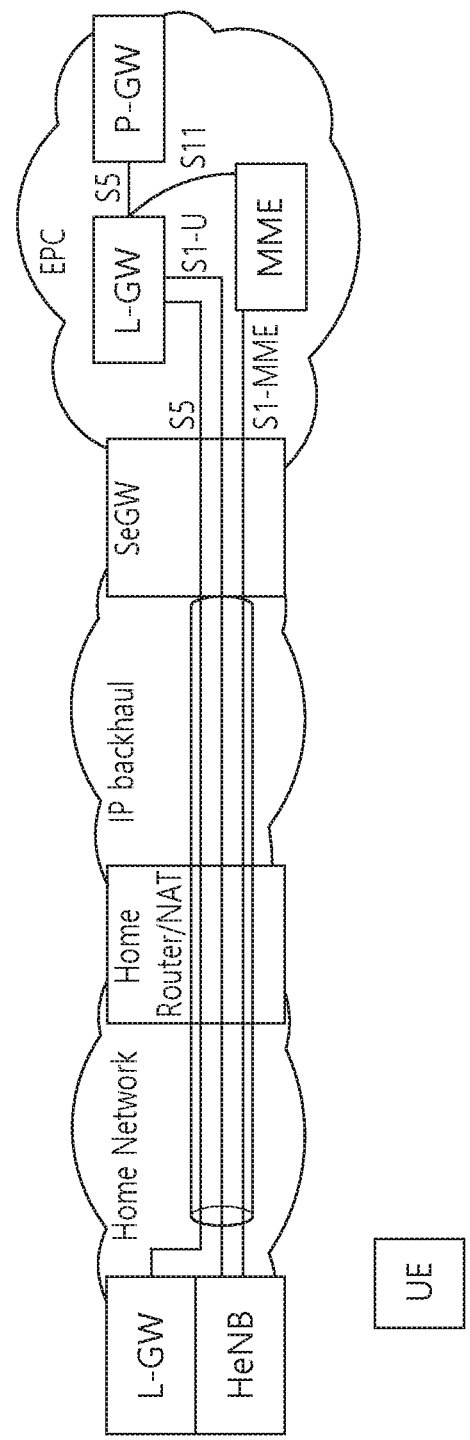
FIG. 1 represents an example of LIPA solution for HeNB using local PDN connection.
Figure 2:
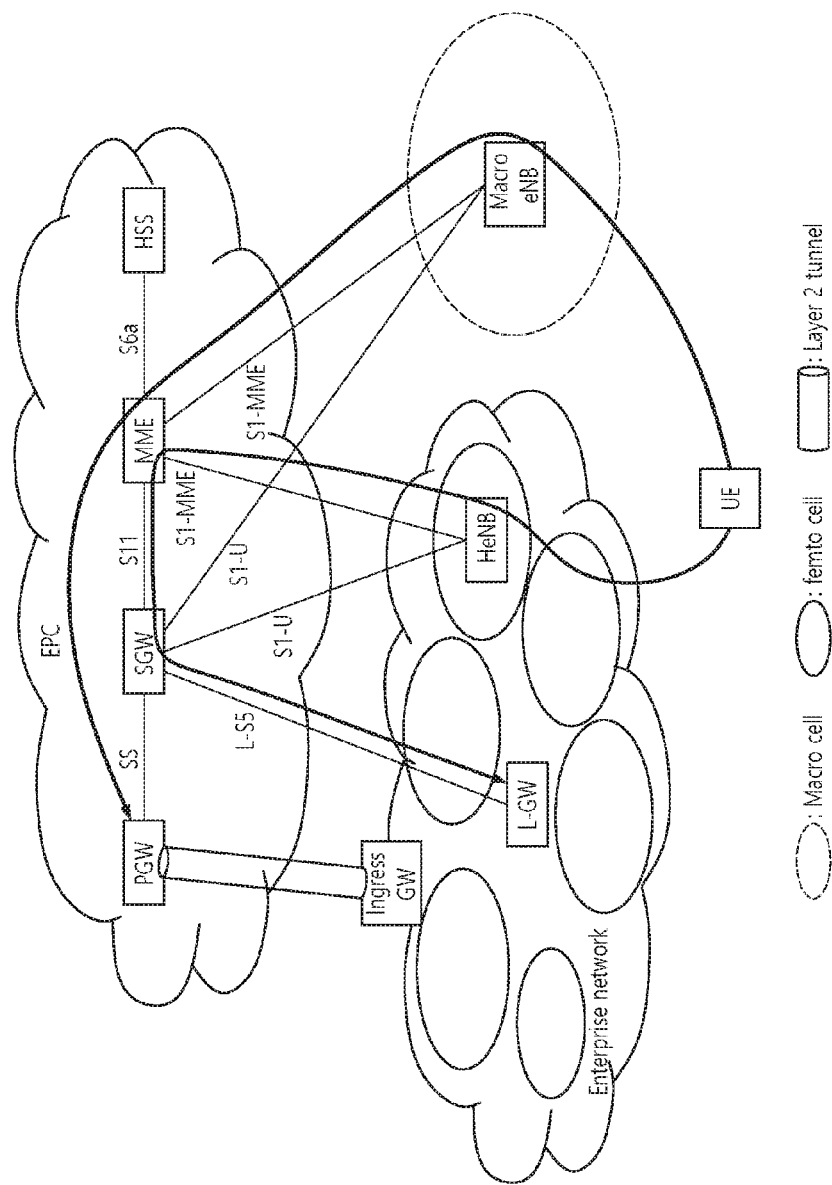
FIG. 2 represents an enterprise access from a macrocell versus an enterprise access from a femtocell.
Figure 3:
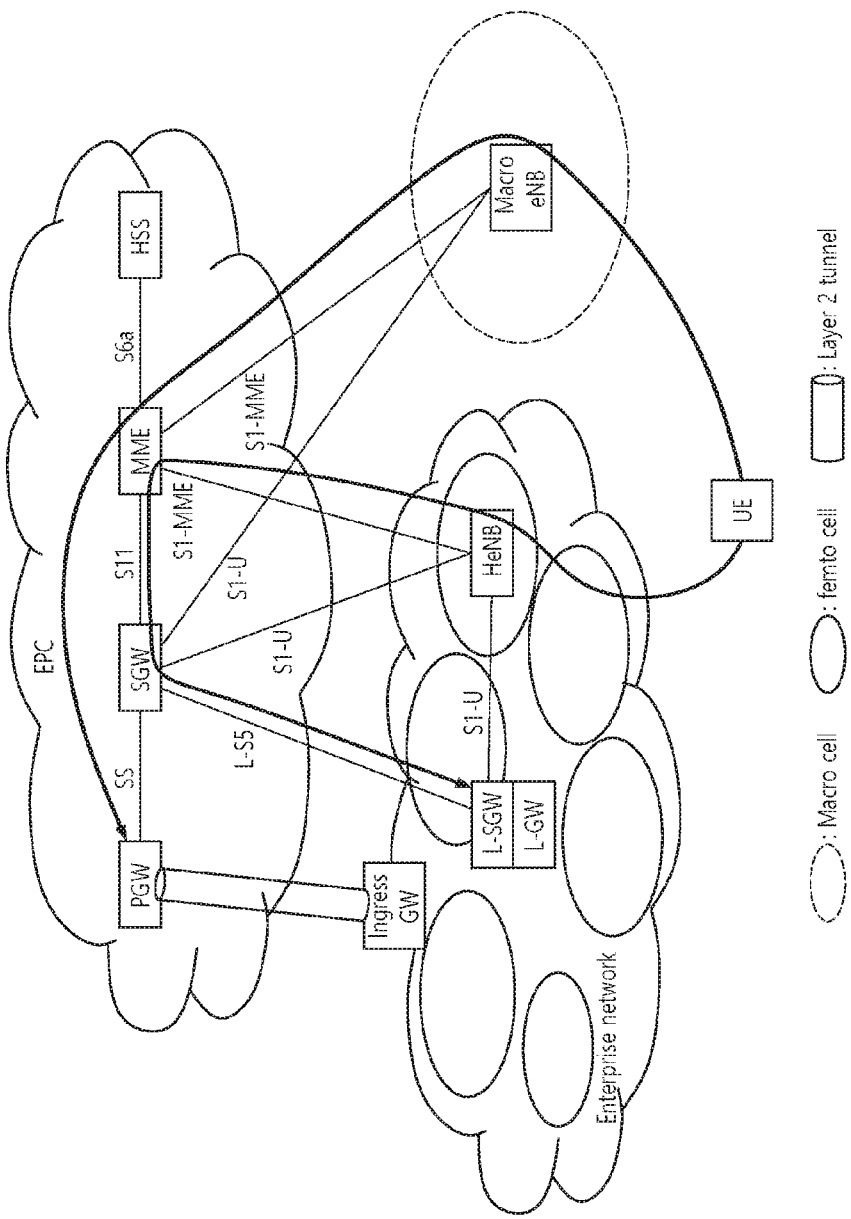
FIG. 3 represents an enterprise access from a macrocell versus an enterprise access from a femtocell, which is an alternative to FIG. 2 with L-SGW.

As shown on FIG. 1, when the communication device, which is called User Equipment or simply UE in the LTE context, is actively communicating with the home-based network, the traffic follows a short-cut path, as follows. Uplink packets sent by the UE and received by the HeNB are forwarded directly to the collocated L-GW function, which relays them towards the home-based network. Downlink packets received by the L-GW function are forwarded directly to the collocated HeNB, which relays them on the radio interface towards the UE.

In other words, when the UE is engaged in active communication, there is no circular traffic exchange across the S1-U and S5 reference points, often referred to as traffic "tromboning".

The upper part of FIG.°5 shows the user-plane information, stored in various EPS nodes according to state of the art, that is used for packet forwarding inside a network with GTP-based S5 (termed S5-GTP). The stored information is described as follows. S1 eNB TEID is a tunnel endpoint identifier used in the GTP-U protocol on S1, assigned by eNB, stored in eNB and SGW. S1 SGW TEID is a tunnel endpoint identifier used in the GTP-U protocol on S1, assigned by SGW, stored in eNB, SGW and MME. S5 SGW TEID is a tunnel endpoint identifier used in the GTP-U protocol on S5, assigned by SGW, stored in SGW and PGW. S5 PGW TEID is a tunnel endpoint identifier used in the GTP-U protocol on S5, assigned by PGW, stored in SGW, PGW and MME.

The lower part of FIG.°5 focuses on the corresponding LIPA scenario, according to an embodiment of the invention, in which the PGW (termed L-GW, for local gateway) becomes collocated with the HeNB. As seen from FIG. 5, state of the art L-GW function and the HeNB function of the collocated node share no information in common.

In order to allow the combined HeNB/L-GW node to identify the mapping between IP packets and corresponding EPS bearers (or E-RABs) it is proposed here to use the S5 PGW TEID parameter as follows.

S5 PGW TEID is known by the MME and is signaled to HeNB across S1-MME as part of the E-RAB context setup in messages like INITIAL CONTEXT SETUP REQUEST or E-RAB SETUP REQUEST, etc. This S5 PGW TEID, abbreviated PGW TEID, can therefore be used as a first correlation ID in an embodiment of the invention.

In a possible embodiment, for downlink packets, the L-GW function performs a usual bearer binding onto EPS bearers, which results in identifying the underlying S5 PGW TEID parameter. The L-GW function then passes (internally) the S5 PGW TEID parameter to the HeNB function along with the IP packet. This is an internal operation in the sense that the L-GW and the HeNB are collocated (so the information does not have to travel through an external network). The interface between the L-GW and the HeNB can however rely on a network protocol, in order (for example) to reuse software bricks developed for a regular PGW which is not collocated with the HeNB.

The HeNB function maps S5 PGW TEID to the corresponding S1 eNB TEID and thus identifies the appropriate E-RAB context and the corresponding Radio Bearer on which to send the packet to the UE.

In a possible embodiment, for uplink packets, the very presence of the S5 PGW TEID parameter in the Radio Bearer context indicates that the packet should be forwarded to the L-GW function, rather than over S1-U (user plane interface). The S5 PGW TEID parameter may be passed (internally) along with the IP packet; this could be used by the L-GW function e.g. to perform bearer binding verification.

FIG.°6 considers the same issue with PMIP-based S5 (S5-PMIP) instead of GTP-based S5.

The upper part of FIG.°6 shows the user-plane information, stored in various EPS nodes according to a known architecture, that is used for packet forwarding inside the network with S5-PMIP. The stored information related to S5 is different from the S5-GTP case (bold italics are used in FIG. 6 for PMIP-specific information) and is described as follows:

S5 SGW GRE is the GRE key used in the GRE encapsulated IP packets on S5, assigned by SGW, stored in SGW and in PGW. GRE stands for Generic Routing Encapsulation and is a tunneling protocol that can encapsulate a wide variety of network layer protocol packet types inside IP tunnels. S5 PGW GRE is the GRE key used in the GRE encapsulated IP packets on S5, assigned by PGW, stored in SGW, PGW and MME.

The lower part of FIG.°6 focuses on the corresponding LIPA scenario in which the PGW (termed L-GW) becomes collocated with the HeNB. As seen from FIG. 6, the L-GW function and the HeNB function of the collocated node share no information in common. In order to allow the combined HeNB/L-GW node to identify the mapping between IP packets and corresponding EPS bearers (or E-RABs) it is proposed here to use the S5 PGW GRE parameter as follows.

S5 PGW GRE is known by the MME and is signaled to HeNB across S1-MME as part of the E-RAB context setup in messages such as INITIAL CONTEXT SETUP REQUEST or E-RAB SETUP REQUEST, etc.

For downlink packets, the L-GW function identifies the S5 PGW GRE key corresponding to the local PDN connection for this UE. The L-GW function passes (internally) the S5 PGW GRE parameter to the HeNB function along with the IP packet. The HeNB function maps S5 PGW GRE to the corresponding Si eNB TEID and thus identifies the appropriate E-RAB context and the corresponding Radio Bearer.

For uplink packets, the very presence of the S5 PGW GRE parameter in the Radio Bearer context indicates that the packet should be forwarded to the L-GW function, rather than over S1-U. The proposed solution for PMIP works only in case there is only one EPS bearer per PDN connection (i.e. the default EPS bearer), which is expected to be the most common LIPA deployment scenario.

Some of the above embodiments or their variants can be integrated in 3GPP standards, for example in the following manner.

FIG. 8 describes an Attach procedure according to 3GPP TS 23.401 ("Evolved Packet Core architecture for 3GPP accesses; Stage 2") modified according to an embodiment of the invention, in which an S5 PGW TEID parameter (for S5-GTP) or an S5 PGW GRE parameter (for S5-PMIP) is added in step°17 of the procedure (i.e. INITIAL CONTEXT SETUP REQUEST message of the S1-AP protocol as specified in 3GPP TS 36.413 "51 Application Protocol (S1-AP)"). The attach/accept is based on NAS (Non-Access-Stratum, a functional layer in the Wireless Telecom protocol stack between Core Network and User Equipment), i.e. a different protocol (the initial context setup request is based on S1-AP), but is piggy backed on the S1 control message. In step 17, the MME decides to attach the correlation ID only if this is necessary. If the connection which establishment is requested is not a LIPA connection, no correlation ID is needed. In step 11, whether the requested connection is LIPA or not, it may be determined that the current CSG is not authorized for LIPA, and should accordingly be denied (as LIPA). It is useful to distinguish the authorization of a LIPA connection from the mere request of a LIPA connection.

FIG.°9 shows a Dedicated Bearer Activation procedure from 3GPP TS 23.401, modified according to an embodiment of the invention, in which an S5 PGW TEID parameter is added in step°4 of the procedure (i.e. BEARER SETUP REQUEST message of the S1-AP protocol). In this case applies only S5-GTP is applicable (no PMIP).

FIG.°10 shows an UE Requested PDN Connectivity procedure from 3GPP 23.401, modified according to an embodiment of the invention, in which an S5 PGW TEID parameter (for S5-GTP) or an S5 PGW GRE parameter (for S5-PMIP) is added in step°7 of the procedure (i.e. BEARER SETUP REQUEST message of the S1-AP protocol).

FIG.°11 shows an S1-based Handover procedure from 3GPP 23.401, modified according to an embodiment of the invention, in which an S5 PGW TEID parameter (for S5-GTP) or an S5 PGW GRE parameter (for 55-PMIP) is added in step°5 of the procedure (i.e. HANDOVER REQUEST message of the S1-AP protocol).

FIG.°12 is the Service Request procedure from 3GPP 23.401, modified according to an embodiment of the invention, in which an S5 PGW TEID parameter (for S5-GTP) or the S5 PGW GRE parameter (for S5-PMIP) is added in step°4 of the procedure (i.e. INITIAL CONTEXT SETUP REQUEST message of the S1-AP protocol).

In order to address the "NAT issue", as shown on FIG. 1, the S1-MME and S1-U reference points can be secured by tunneling inside an IPsec tunnel, established between the HeNB and the SeGW, as specified in 3GPP TS 33.320 v1.0.0 "3GPP Security Aspect of Home NodeB and Home eNodeB". On top of this standardized security mechanism, FIG.°1 proposes that the S5 reference point (between SGW and L-GW) be also secured by tunneling inside the same IPsec tunnel established between the HeNB and the SeGW.

Such an arrangement provides a convenient solution to the L-GW function reachability. Namely, the L-GW function resides in the home network and uses a private IP address. As such, it is not easily reachable from the outside e.g. for signaling transactions initiated by the SGW over S5.

By tunneling S5 inside an IPsec tunnel, the L-GW function becomes reachable via an IP address assigned from the Evolved Packet Core network. In theory, S5 could be tunneled in a different IPsec tunnel than the one used for S1, however, it is advantageous not to do it. Indeed, contrary to the IPsec tunnel for S1 that is up and running permanently, the S5 IPsec tunnel is needed only when the femtocell user needs access to the home-based network. In addition, opening two IPsec tunnels could typically require twice more credentials (different credentials are typically required to authenticate parties through different IPsec tunnels), and could pose scalability issues while increasing complexity. Reusing the same credentials would be conceivable in certain instances but may lower the security, depending on the specific situation.

When using S5-GTP, there are two instances of the GTP-U protocol inside the IPsec tunnel: GTP-U over S1-U and GTP-U over S5. This creates an issue as explained in FIG.°7.

FIG.°7 shows the user plane protocol stacks on S1-U and S5. The GTP-U protocol is transported over UDP and has a well-known UDP port number (port number 2152). If the combined HeNB/L-GW node uses the same IP address for both S1-U and S5, the SGW will be unable to discriminate packets flowing on S1-U from packets flowing on S5.

In order to allow the SGW to discriminate packets flowing on S1-U from packets flowing on S5, a possible embodiment of the combined HeNB/L-GW node uses two different addresses: one for the HeNB function and the other one for the L-GW function. For example, an IPsec tunnel between HeNB and SeGW is established, in accordance with 3GPP TS 33.320 v1.0.0 ("3GPP Security Aspect of Home NodeB and Home eNodeB") with the IKEv2 protocol (IETF RFC 4306 "Internet Key Exchange IKEv2 protocol"). According to a possible embodiment, it is proposed to take advantage of the fact that the IKEv2 protocol allows the "initiator" to request multiple "internal IP addresses" via the CFG_REQUEST configuration payload during the initial IKEv2 exchange (see clause 3.15.1 in RFC 4306). In the "initiator" role, the combined HeNB/L-GW node may then request at least two internal IP addresses and assign one to the HeNB and another one to the L-GW functions. Upon setup of the S1-MME interface, the L-GW address is passed to the MME as part of the S1 SETUP REQUEST message defined in 3GPP TS 36.413 ("S1 Application Protocol (S1-AP)"). Alternatively, the L-GW address can be passed in the INITIAL UE MESSAGE message defined in TS 36.413, however this is typically less efficient than sending it in the 51 SETUP REQUEST message.

Alternatively, it is possible to have the HeNB function and the L-GW function share the same IP address, and to configure the TEID assignment logic in the HeNB and the L-GW so that the same TEID is never used simultaneously on both S5 and S1-U. For instance this can be achieved by dividing the TEID value range into two disjoint subranges that are reserved for the HeNB and L-GW function, respectively. The Subranges are preferably contiguous, however any subrange is in principle acceptable, for example one could arbitrarily decide that odd TEIDs are for S5 and even TEIDs are for S1-U, or vice versa. The entity assigning the TEIDs is not the SGW, but the HeNB/L-GW.

When PMIP is used on S5 it is also possible to use two different IP addresses for the HeNB and the L-GW function, but this is not required, because the user plane protocols on S1-U and S5 are different (GTP-U vs GRE encapsulated IP packets), so it is possible to discriminate between the data streams even with a single IP address. Having two IP addresses may however simplify the discrimination between the two protocols.

Some of the above embodiments or their variants can be integrated in 3GPP standards, for example as depicted on FIG.°14, which shows the IKEv2 signaling for establishment of IPsec tunnel between HeNB and SeGW from 3GPP TS 33.320 v1.0.0 ("3GPP Security Aspect of Home NodeB and Home eNodeB"), modified according to an embodiment of the invention so that the call flow involves a CFP_RE-QUEST configuration payload in step°4 of the procedure modified to request two "internal" IP addresses: one for the HeNB and another one for the L-GW functions. Similarly, the CSF_REPLY in step°7 is used by the SeGW to provide the requested IP addresses.

Regarding the "Lawful Intercept issue", a problem lies in the fact that the packets flowing on the short-cut path (in the absence of tromboning) are outside of the reach of the EPC operator.

In order to assist Lawful Intercept it is proposed here, based on EPC request, to send a copy of every IP packet (exchanged across the short-cut path) on S1-U and S5, respectively. The details of this procedure are as follows. Upon establishment of the local PDN connection or at any time afterwards, the MME may request from the HeNB (e.g. in INITIAL CONTEXT SETUP REQUEST message or E-RAB SETUP REQUEST message or UE CONTEXT MODIFICATION REQUEST message) to send a copy of every uplink packet on S1-U. Each packet copy is tagged as such via a new flag in the GTP-U encapsulation header, so that it can be consumed at the SGW without being forwarded on S5. Upon establishment of the local PDN connection or at any time afterwards, the MME may request from the L-GW function (e.g. Create Session Request message and Modify Bearer Request with S5-GTP; Proxy Binding Update with S5-PMIP) to send a copy of every downlink packet on S5. Each packet copy is tagged as such via a new flag in the GTP-U or GRE encapsulation header, so that it can be consumed at the SGW without being forwarded on S1-U.

Given the collocation of the HeNB function and L-GW function in the same node, it may suffice to activate the Lawful Intercept feature on the S1-MME side only. The HeNB function in the combined HeNB/L-GW node can then internally request the activation of the Lawful Intercept feature from the collocated L-GW function.

Some of the above embodiments or their variants can be integrated in 3GPP standards, for example as depicted in FIG.°15, which shows the UE Context Modification procedure from 3GPP TS 36.413 ("S1 Application Protocol (S1-AP)"), modified according to an embodiment of the invention so that the flow involves an UE CONTEXT MODIFICATION REQUEST message used to turn the Lawful Intercept feature on or off. The HeNB function in the combined HeNB/L-GW function then internally notifies the L-GW function to activate or deactivate the Lawful Intercept feature.

According to a possible embodiment, a solution is proposed to optimize paging for multiple PDN connections.

Paging may work in the manner proposed in 3GPP S2-095348 "Open issues and solution for SIPTO and LIPA services". In particular, when UE is in Idle mode there is no direct path between L-GW and the HeNB; the downlink packets are consequently sent to the SGW across S5. SGW buffers the downlink packets and triggers the paging procedure via the MME; there are no modifications compared to how paging works in the original EPC architecture described in 3GPP TS 23.401 ("Evolved Packet Core architecture for 3GPP accesses; Stage 2"). When UE responds to paging and enters Connected mode, the direct path between HeNB and L-GW becomes active. All future packet exchanges between HeNB and L-GW follow the direct path, until the UE is moved to Idle mode again.

As illustrated in FIG. 1, the UE may have an established external PDN connection in addition to the LIPA PDN connection. When downlink data arrive at the SGW either from the L-GW or from the external PGW, and the UE is in IDLE mode, the SGW sends a Downlink Data Notification (DDN) message to the MME triggering the latter to start paging the UE.

Presently the DDN message contains no information about the PDN connection on which the downlink data are arriving.

In certain LIPA scenarios it may be beneficial to inform the MME about the underlying PDN connection so that it can make a finer decision.

A possible scenario in which the invention can be advantageous is the following. A User's femtocell is in the same Tracking Area as the surrounding macrocell. Therefore the MME does not always know whether the idle UE is camping on the femtocell or on the macrocell. When downlink data arrive on the LIPA PDN connection and if the user is not allowed to access his home network from a macrocell, the UE should ideally be paged only in the femtocell rather than in the whole Tracking Area. This can be achieved by indicating the PDN connection in the Downlink Data Notification message.

Another possible scenario in which the invention can be advantageous is the following. A femtocell (e.g. in a house) offers a spotty coverage (e.g. a big house or thick walls). Quite often the user goes out of femtocell coverage in which case the communication is handed over to a macrocell. When in macrocell the user is not allowed to access his home network, but is naturally allowed access to the external PDN connection. Despite the fact the user cannot access his home network, the MME does not release the LIPA PDN connection in order to avoid unnecessary signaling. When re-selecting between femtocell and macrocell coverage, the user sends a Tracking Area Update so that the MME knows whether the idle UE is in femtocell or macrocell coverage.

When downlink data arrive on the local network the MME should not page the UE if the UE is in a macro cell. This can be achieved by indicating the PDN connection in the Downlink Data Notification message.

Some of the above embodiments or their variants can be integrated in 3GPP standards, for example in the manner illustrated on FIG.°13. FIG.°13 is a Network triggered Service Request procedure from 3GPP 23.401, modified according to an embodiment of the invention, in which a Linked EPS Bearer ID (LBI) parameter is added in step°2a of the procedure (i.e. DOWNLINK DATA NOTIFICATION message of the GTPc-v2 protocol defined in 3GPP TS 29.274 "GPRS Tunneling Protocol; Stage 3").

According to an embodiment of the invention, user subscription information stored in the HSS is enhanced by associating the Packet Data Network's (PDN's) Access Point Name (APN) with the Closed Subscriber Group identifier (CSG ID) of the femtocell(s) from which the user is allowed to establish a PDN connection according to the Local IP Access (LIPA) principles. Specifically, the enhanced user's subscription information allows the Mobility Management Entity (MME) to override the usual PDN Gateway (PGW) selection algorithm with a LIPA-specific Local Gateway (L-GW) selection algorithm.

Figure 4:
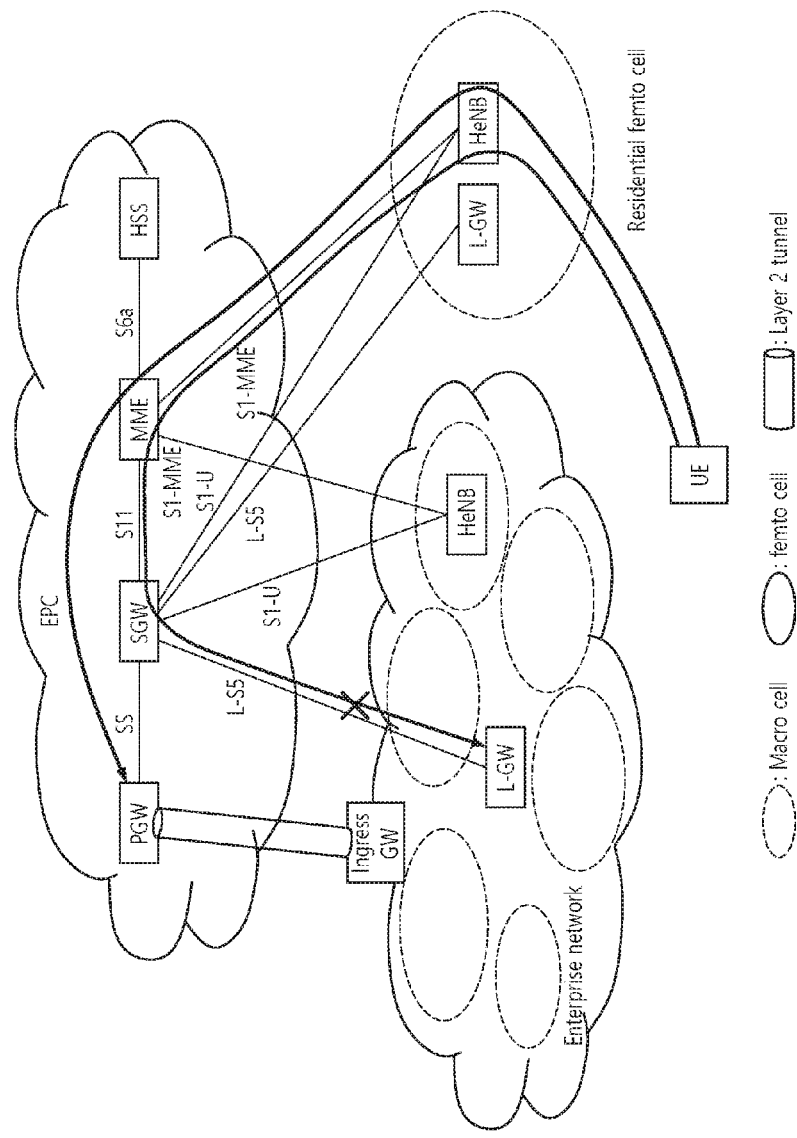
FIG. 4 represents an error case in which no enterprise access should be allowed from the femtocell.
Figure 14:
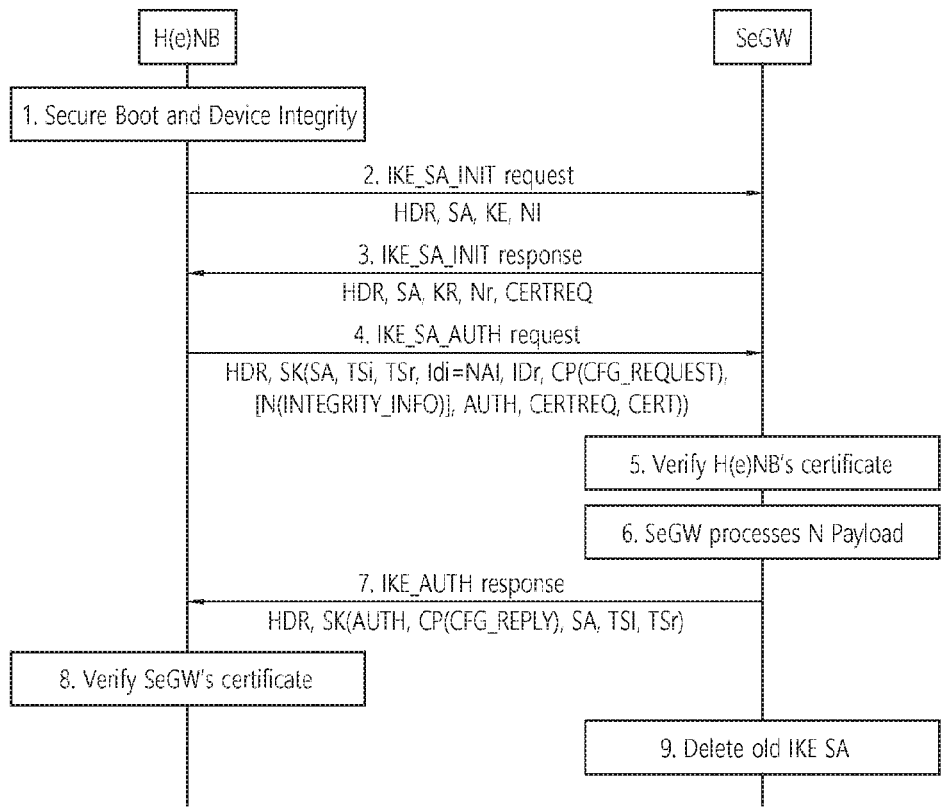
FIG. 14 represents an IKEv2 signaling for establishment of IPsec tunnel between HeNB and SeGW (from 3GPP TS 33.320 v1.0.0 "3GPP Security Aspect of Home NodeB and Home eNodeB")
Figure 15:
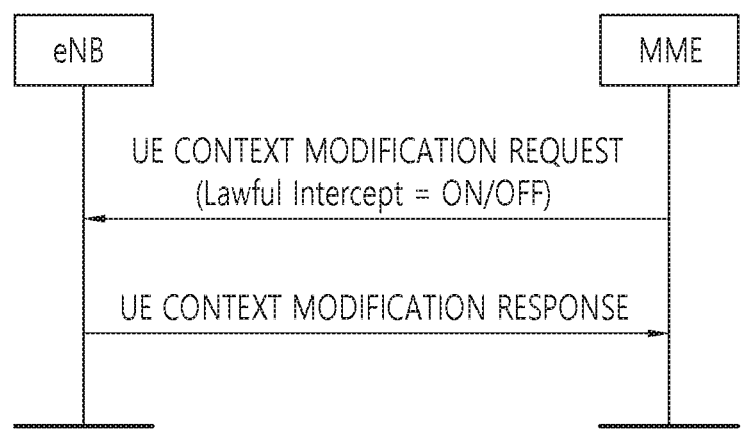
FIG. 15 represents a UE Context Modification procedure (from 3GPP TS 36.413 "S1 Application Protocol (S1-AP)") with additional parameters.

As seen from Table 5.7.1-1 of 3GPP TS 23.401, which describes the information storage in HSS according to state of the art, the CSG Subscription Data i.e. a list of CSG IDs to which the user can have femtocell access, is specified outside of the PDN subscription contexts. However, in order to avoid error cases like the one described in FIG. 4, it is proposed, in a possible embodiment, that the APN that can be used for LIPA access be explicitly associated with the CSG IDs from which the user can access the corresponding PDN in LIPA fashion.

In a possible embodiment, it is proposed to enhance the user's subscription record in the HSS as indicated in the table below. Namely, for each Access Point Name (APN) that is associated with a Packet Data Network (PDN) that can be accessed via Local IP Access (LIPA) it is proposed to define an optional parameter "CSG IDs for Local IP Access" indicating the CSG IDs of femtocells from which this PDN can be accessed in LIPA fashion. The enhancements are indicated in bold italics.

| Field | Description |
| --- | --- |
| IMSI | IMSI is the main reference key. |
| MSISDN | The basic MSISDN of the UE (Presence of MSISDN is optional). |
| IMEI/IMEISV | International Mobile Equipment Identity - Software Version Number |
| MME Identity | The Identity of the MME currently serving this MS. |
| MME Capabilities | Indicates the capabilities of the MME with respect to core functionality e.g. regional access restrictions. |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. |
| EPS Subscribed Charging Characteristics | The charging characteristics for the MS, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/Serving GW/PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform DNS queries. This replacement applies for all the APNs in the subscriber's profile. |
| RFSP Index | An index to specific RRM configuration in the E-UTRAN |
| URRP-MME | UE Reachability Request Parameter indicating that UE activity notification from MME has been requested by the HSS. |
| CSG Subscription Data | The CSG Subscription Data is a list of CSG IDs per PLMN and for each CSG ID optionally an associated expiration date which indicates the point in time when the subscription to the CSG ID expires; an absent expiration date indicates unlimited subscription. |
| Each subscription profile contains one or more PDN subscription contexts: | |
| Context Identifier | Index of the PDN subscription context. |
| PDN Address | Indicates subscribed IP address(es). |
| PDN Type | Indicates the subscribed PDN Type (IPv4, IPv6, IPv4v6) |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| Access Point Name (APN) | A label according to DNS naming conventions describing the access point to the packet data network (or a wildcard) (NOTE 6). |
| *CSG IDs for Local IP Access* | *For PDNs that can be accessed via Local IP Access (LIPA) this optional parameter Indicates the CSG IDs from which such access is possible* |
| EPS subscribed QoS profile | The bearer level QoS parameter values for that APN's default bearer (QCI and ARP) (see clause 4.7.3). |

-continued

| Field | Description |
| --- | --- |
| Subscribed-APN-AMBR | The maximum aggregated uplink and downlink MBRs to be shared across all Non-GBR bearers, which are established for this APN. |
| EPS PDN Subscribed Charging Characteristics | The charging characteristics of this PDN Subscribed context for the MS, e.g. normal, prepaid, flat-rate, and/or hot billing subscription. The charging characteristics is associated with this APN. |
| VPLMN Address Allowed | Specifies whether for this APN the UE is allowed to use the PDN GW in the domain of the HPLMN only, or additionally the PDN GW in the domain of the VPLMN. |
| PDN GW identity | The identity of the PDN GW used for this APN. The PDN GW identity may be either an FQDN or an IP address. The PDN GW identity refers to a specific PDN GW. |
| PDN GW Allocation Type | Indicates whether the PDN GW is statically allocated or dynamically selected by other nodes. A statically allocated PDN GW is not changed during PDN GW selection. |
| PLMN of PDN GW | Identifies the PLMN in which the dynamically selected PDN GW is located. |
| Homogenous Support of IMS Over PS Sessions for MME | Indicates whether or not "IMS Voice over PS Sessions" is supported homogeneously in all TAs in the serving MME. |
| List of APN - PDN GW ID relations (for PDN subscription context with wildcard APN): | |
| APN - P-GW relation #n | The APN and the identity of the dynamically allocated PDN GW of a PDN connection that is authorised by the PDN subscription context with the wildcard APN. The PDN GW identity may be either an FQDN or an IP address. The PDN GW identity refers to a specific PDN GW. |

This is advantageous, since it enables the network (through the HSS), rather than the user equipment, to determine the address of the L-GW, which is a preferred scenario.

In an alternative embodiment, for each CSG ID in the CSG Subscription Data record that can be used for Local IP Access (LIPA) it is proposed to associate the Access Point name (APN) of the Packet Data network (PDN) that can be accessed in LIPA fashion. This is shown on the table below (enhancements in bold italics).

| Field | Description |
| --- | --- |
| IMEI/IMEISV | International Mobile Equipment Identity - Software Version Number |
| MME Identity | The Identity of the MME currently serving this MS. |
| MME Capabilities | Indicates the capabilities of the MME with respect to core functionality e.g. regional access restrictions. |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. |
| EPS Subscribed Charging Characteristics | The charging characteristics for the MS, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/Serving GW/PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform DNS queries. This replacement applies for all the APNs in the subscriber's profile. |
| RFSP Index | An index to specific RRM configuration in the E-UTRAN |
| URRP-MME | UE Reachability Request Parameter indicating that UE activity notification from MME has been requested by the HSS. |

| Field | Description |
| --- | --- |
| CSG Subscription Data | The CSG Subscription Data is a list of CSG IDs per PLMN and for each CSG ID optionally an associated expiration date which indicates the point in time when the subscription to the CSG ID expires; an absent expiration date indicates unlimited subscription.<br>*For CSG Ids that can be used to access a specific PDN via Local IP Access (LIPA), the CSG ID entry is associated with the Access Point Name (APN) of that PDN.* |
| Each subscription profile contains one or more PDN subscription contexts: | |
| Context Identifier | Index of the PDN subscription context. |
| PDN Address | Indicates subscribed IP address(es). |
| PDN Type | Indicates the subscribed PDN Type (IPv4, IPv6, IPv4v6) |
| Access Point Name (APN) | A label according to DNS naming conventions describing the access point to the packet data network (or a wildcard) (NOTE 6). |
| EPS subscribed QoS profile | The bearer level QoS parameter values for that APN's default bearer (QCI and ARP) (see clause 4.7.3). |
| Subscribed-APN-AMBR | The maximum aggregated uplink and downlink MBRs to be shared across all Non-GBR bearers, which are established for this APN. |
| EPS PDN Subscribed Charging Characteristics | The charging characteristics of this PDN Subscribed context for the MS, e.g. normal, prepaid, flat-rate, and/or hot billing subscription. The charging characteristics is associated with this APN. |
| VPLMN Address Allowed | Specifies whether for this APN the UE is allowed to use the PDN GW in the domain of the HPLMN only, or additionally the PDN GW in the domain of the VPLMN. |
| PDN GW identity | The identity of the PDN GW used for this APN. The PDN GW identity may be either an FQDN or an IP address. The PDN GW identity refers to a specific PDN GW. |
| PDN GW Allocation Type | Indicates whether the PDN GW is statically allocated or dynamically selected by other nodes. A statically allocated PDN GW is not changed during PDN GW selection. |
| PLMN of PDN GW | Identifies the PLMN in which the dynamically selected PDN GW is located. |
| Homogenous Support of IMS Over PS Sessions for MME | Indicates whether or not "IMS Voice over PS Sessions" is supported homogeneously in all TAs in the serving MME. |
| List of APN - PDN GW ID relations (for PDN subscription context with wildcard APN): | |
| APN - P-GW relation #n | The APN and the identity of the dynamically allocated PDN GW of a PDN connection that is authorised by the PDN subscription context with the wildcard APN. The PDN GW identity may be either an FQDN or an IP address. The PDN GW identity refers to a specific PDN GW. |

The above enhancements in the user's subscription record stored in the HSS are advantageous, in particular due to their ability to assist the Mobility Management Entity (MME) in deciding whether the user can be granted access to the requested packet data network via Local IP Access (LIPA).

Figure 16:
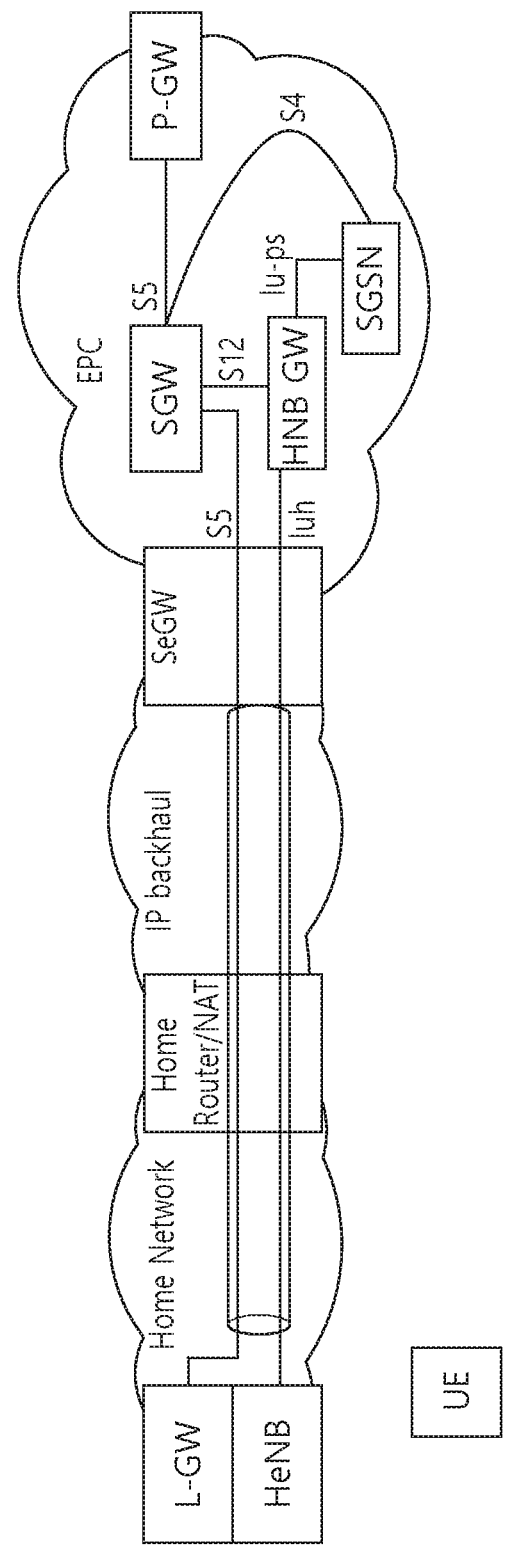
FIG. 16 represents the equivalent LIPA solution for HNB using local PDN connection.

The invention is not limited to the above described exemplary embodiments, and also encompasses many different variants. In particular, most embodiments have been described in the context of E-UTRAN (with a HeNB), but can be adapted in straight-forward manner to a UTRAN context (with a HNB connecting to the Evolved Packet Core EPC, the EPC network supporting a S4-SGSN node described in 3GPP TS 23.401 "Evolved Packet Core architecture for 3GPP accesses; Stage 2". An example of equivalent LIPA architecture for HNB femtocells is shown on FIG. 16.

The following is the summary of modifications compared to the architecture for HeNB femto cells described in FIG. 1.

HeNB and MME are replaced by HNB and SGSN, respectively. An extra node referred to as HNB GW (specified in 3GPP TS 25.467 "UTRAN architecture for 3G Home Node B (HNB); Stage 2") is added, and is connected to the HNB and the SGW via the Iuh and the S12 reference point, respectively. The S11 interface is replaced by an S4 interface. The S5 PGW TEID or the S5 PGW GRE parameter is carried within the RAB ASSIGNMENT REQUEST message (defined in 3GPP TS 25.413 "RANAP protocol"). On the Iu interface, the L-GW address is carried within the INITIAL UE MESSAGE message (defined in 3GPP TS 25.413). On the Iuh interface, the L-GW address is carried within the HNB REGISTER REQUEST message (defined in 3GPP TS 25.467). Alternatively (but less efficiently), the L-GW address is carried within the UE REGISTER REQUEST message (defined in 3GPP TS 25.467).

In a possible embodiment, for the purpose of Lawful Intercept, a copy of each uplink IP packet is forwarded across Iuh/S12. The user plane protocol being the same as in the S1-U case (i.e. GTP-U), the new tag in the GTP-U encapsulation described earlier is exactly the same. UE SPECIFIC INFORMATION INDICATION message (defined in 3GPP TS 25.413) can be used (instead of the UE CONTEXT MODIFICATION REQUEST message) to turn the Lawful Intercept feature on or off.

In the above embodiments, the "remote" endpoint of the IPsec tunnel has been described as being the security gateway of the LTE standard, however it could be any security gateway, i.e. any node residing inside the operator's packet core network which deals with security in the sense that it manages an IPsec tunnel.

More generally, the invention is applicable to other wireless technologies such as WCDMA, GSM, CDMA2000, TD-SCDMA, or WiMAX. The vocabulary used in the described embodiment is the conventional vocabulary in the context of LTE, however other standards use a different terminology. The invention is not limited to LTE by the use of LTE vocabulary. For example the GSM standard refers to "mobile stations" comprising a "mobile equipment" (typically a cell phone) equipped with a SIM card. Despite the fact that the described embodiments commonly refer to a "user equipment", any communication device compliant with the requirement laid out in relation with said embodiments is appropriate, even a GSM compliant communication device.

What is claimed is:

1. A node for processing a downlink packet, the node comprising:
    a home base station providing a first interface; and
    a local gateway (L-GW) providing a second interface for local Internet Protocol (IP) access, wherein:
        the L-GW is collocated with the home base station,
        the first interface is configured between the home base station and a gateway for the home base station,
        a first IP address used by the home base station is assigned to the first interface and the second IP address used by the home base station is assigned to the second interface,
        identification information used by the home base station to discriminate the downlink packet is differently determined to be one of first information and second information based on whether or not the first IP address is same as the second IP address,
        the first information includes distinct ranges of Tunnel Endpoint Identifiers (TEIDs) being assigned to the first and second interfaces,
        the second information includes the first and second IP addresses,
        if the first IP address is same as the second IP address, the home base uses the first information to discriminate the downlink packet, and
        if the first IP address is different from the second IP address, the home base station uses the second information to discriminate the downlink packet.

2. The node of claim 1, wherein the home base station is a home evolved nodeB (HeNB) or a home nodeB (HNB).

3. The node of claim 1, wherein the second interface is an S5 interface.

4. The node of claim 1, wherein the first interface is an Iuh user plane interface or an S1-U interface.

5. The node of claim 1, wherein the downlink packet is delivered on the first and second interfaces.

6. A method for processing a downlink packet, the method comprising:
    configuring, by a node comprising a home base station and a local gateway (L-GW), a first interface and a second interface,
    wherein the home base station provides the first interface and the (L-GW) provides the second interface for local Internet Protocol (IP) access, and the L-GW is collocated with the home base station; and
    discriminating, by the home base station, a downlink packet, wherein:
        the first interface is configured between the home base station and a gateway for the home base station,
        a first IP address used by the home base station is assigned to the first interface and the second IP address by the home base station is assigned to the second interface,
        identification information used by the home base station to discriminate the downlink packet is differently determined to be one of first information and second information based on whether or not the first IP address is same as the second IP address,
        the first information includes distinct ranges of Tunnel Endpoint Identifiers (TEIDs) being assigned to the first and second interfaces,
        the second information includes the first and second IP addresses,
        if the first IP address is same as the second IP address, the home base station uses the first information to discriminate the downlink packet, and
        if the first IP address is different from the second IP address, the home base station uses the second information to discriminate the downlink packet.

7. The method of claim 6, wherein the home base station is a home evolved nodeB (HeNB) or a home nodeB (HNB).

8. The method of claim 6, wherein the second interface is an S5 interface.

9. The method of claim 6, wherein the first interface is an Iuh user plane interface or an S1-U interface.

10. The method of claim 6, wherein the downlink packet is delivered on the first and second interfaces.

* * * * *